(12) United States Patent
MacKinnon et al.

(10) Patent No.: US 7,977,392 B2
(45) Date of Patent: Jul. 12, 2011

(54) WATER INSOLUBLE ADDITIVE FOR IMPROVING CONDUCTIVITY OF AN ION EXCHANGE MEMBRANE

(75) Inventors: Sean M. MacKinnon, Fairport, NY (US); Scott J. McDermid, Vancouver (CA); Lukas M. Bonorand, Coquitlam (CA); Timothy J. Peckham, Vancouver (CA); Keping Wang, Richmond (CA); Jing Li, Burnaby (CA)

(73) Assignee: Daimler AG, Stuttgart (DE)

( * ) Notice: Subject to any disclaimer, the term of this patent is extended or adjusted under 35 U.S.C. 154(b) by 861 days.

(21) Appl. No.: 11/613,803

(22) Filed: Dec. 20, 2006

(65) Prior Publication Data

US 2007/0154764 A1 Jul. 5, 2007

Related U.S. Application Data

(60) Provisional application No. 60/753,440, filed on Dec. 22, 2005.

(51) Int. Cl.
B01J 49/00 (2006.01)
B01J 39/18 (2006.01)
H01M 8/10 (2006.01)
H01M 4/48 (2006.01)

(52) U.S. Cl. ............. 521/27; 521/37; 429/479; 429/488
(58) Field of Classification Search ............. 521/27, 521/37; 429/33, 479, 488
See application file for complete search history.

(56) References Cited

U.S. PATENT DOCUMENTS

| | | | |
|---|---|---|---|
| 4,634,530 A | 1/1987 | Kuder et al. | |
| 4,933,397 A | 6/1990 | Sansone et al. | |
| 5,525,436 A | 6/1996 | Savinell et al. | |
| 5,599,639 A | 2/1997 | Sansone et al. | |
| 5,945,233 A | 8/1999 | Onorato et al. | |
| 5,965,054 A | 10/1999 | McEwen et al. | |
| 6,059,943 A | 5/2000 | Murphy et al. | |
| 6,124,060 A | 9/2000 | Akita et al. | |
| 6,187,231 B1 | 2/2001 | Sansone et al. | |
| 6,680,138 B1 | 1/2004 | Honma et al. | |
| 6,706,834 B2 | 3/2004 | Wlassics et al. | |
| 6,982,303 B2 * | 1/2006 | Kerres et al. | 525/535 |
| 7,064,226 B2 * | 6/2006 | Sullivan et al. | 556/404 |
| 7,094,851 B2 | 8/2006 | Wu et al. | |
| 2002/0068207 A1 | 6/2002 | Baldauf et al. | |
| 2003/0032739 A1* | 2/2003 | Kerres et al. | 525/535 |
| 2004/0062970 A1 | 4/2004 | Nomura et al. | |
| 2004/0248013 A1 | 12/2004 | Wariishi et al. | |
| 2005/0053818 A1 | 3/2005 | St-Arnaud et al. | |
| 2005/0106440 A1 | 5/2005 | Komiya | |
| 2005/0112439 A1 | 5/2005 | MacKinnon et al. | |
| 2005/0113547 A1 | 5/2005 | Li et al. | |
| 2005/0175880 A1 | 8/2005 | Cho et al. | |

FOREIGN PATENT DOCUMENTS

| | | |
|---|---|---|
| EP | 1 592 025 A1 | 11/2005 |
| EP | 1 646 097 A2 | 4/2006 |
| JP | 2001011219 A | 1/2001 |
| JP | 2001-155744 | 6/2001 |
| WO | WO 00/70693 A2 | 11/2000 |
| WO | WO 02055587 A1 * | 7/2002 |
| WO | WO 03/083985 A2 | 10/2003 |
| WO | WO 2004/067611 A1 | 8/2004 |
| WO | WO 2005/036687 A2 | 4/2005 |
| WO | WO 2005/072413 A2 | 8/2005 |

OTHER PUBLICATIONS

Adjemian et al., "Silicon Oxide Nafion Composite Membranes for Proton-Exchange Membrane Fuel Cell operation at 80-140° C.," Journal of the Electrochemical Society 149(3):A256-A261, 2002.
Apichatachutapan et al., "Asymmetric Nafion/(Zirconium Oxide) Hybrid Membranes via in Situ Sol-Gel Chemistry," Journal of Applied Polymer Science 62:417-426, 1996.
Deng et al., "Nafione® / (SiO2, ORMOSIL, and Dimethylsiloxane) Hybrids Via In Situ Sol-Gel Reactions: Characterization of Fundamental Properties," Journal of Applied Polymer Science 68:747-763, 1998.
Doyle et al., "High-Temperature Proton Conducting Membranes Based on Perfluorinated Ionomer Membrane-Ionic Liquid Composites," Journal of the Electrochemical Society 147(1):34-37, 2000.
Matsuda et al., "Proton conductivity and structure of phosphosilicate gels derived from tetraethoxysilane and phosphoric acid or triethylphosphate," Solid State Ionics 139:113-119, 2001.
Nagai et al., "Inorganic-organic composite protonic conductors comprising silicophosphate glass and ion-exchange resin," Solid State Ionics 136-137:249-254, 2000.
Nogami et al., "A Sol-Gel-Derived Glass as a Fuel Cell Electrolyte," Advanced Materials 12(18):1370-1372, 2000.
Oren et al., "Highly conductive ordered heterogeneous ion-exchange membranes," Journal of Membrane Sciences 239:17-26, 2004.
Wainwright et al., "Acid-Doped Polybenzimidazoles: A New Polymer Electrolyte," J. Electrochem. Soc. 142(7):L121-L123, Jul. 1995.
Yang et al., "Approaches and technical challenges to high temperature operation of proton exchange membrane fuel cells," Journal of Power Sources 103:1-9, 2001.

* cited by examiner

*Primary Examiner* — Michael M Bernshteyn
(74) *Attorney, Agent, or Firm* — Crowell & Moring LLP

(57) ABSTRACT

A water insoluble additive for improving the performance of an ion-exchange membrane, such as in the context of the high temperature operation of electrochemical fuel cells. The insoluble additive comprises a metal oxide cross-linked matrix having proton conducting groups covalently attached to the matrix through linkers. In one embodiment, the metal is silicon and the cross-linked matrix is a siloxane cross-linked matrix containing silicon atoms cross-linked by multiple disiloxy bonds and having proton conducting groups covalently attached to the silicon atoms through alkanediyl linkers.

13 Claims, 1 Drawing Sheet

WATER INSOLUBLE ADDITIVE FOR IMPROVING CONDUCTIVITY OF AN ION EXCHANGE MEMBRANE

CROSS-REFERENCE TO RELATED APPLICATION

This application claims the benefit under 35 U.S.C. §119 (e) of U.S. Provisional Patent Application No. 60/753,440 filed Dec. 22, 2005, which is incorporated herein by reference in its entirety.

BACKGROUND OF THE INVENTION

1. Field of the Invention

This invention generally relates to a water insoluble additive for improving the performance of an ion exchange membrane, particularly in the context of high temperature operation of electrochemical fuel cells.

2. Description of the Related Art

Electrochemical fuel cells convert reactants, namely fuel and oxidant streams, to generate electric power and reaction products. Electrochemical fuel cells generally employ an electrolyte disposed between two electrodes, a cathode and an anode. An electrocatalyst induces the desired electrochemical reactions at the electrodes. In addition to the electrocatalyst, the electrodes may also contain an electrically conductive substrate upon which the electrocatalyst is deposited. The electrocatalyst may be a metal black (such as a substantially pure, unsupported finely divided metal or metal powder) an alloy, or a supported metal catalyst (such as platinum on carbon particles).

One type of electrochemical fuel cell is a proton exchange membrane (PEM) fuel cell. Such fuel cells employ a membrane electrode assembly (MEA) comprising an ion-exchange membrane as the electrolyte disposed between the two electrodes. Ion-exchange membranes that have received considerable attention are those prepared from fluoropolymers and which contain pendant sulfonic acid functional groups functional groups. A representative polymer in this regard can be obtained from DuPont Inc. under the trade name Nafion®.

A broad range of reactants can be used in electrochemical fuel cells. For example, the fuel stream may be substantially pure hydrogen gas, a gaseous hydrogen containing reformate stream, or methanol in a direct methanol fuel cell. The oxidant may be substantially pure oxygen or a dilute oxygen stream such as air.

The electrochemical oxidation that occurs at the anode electrocatalyst of a PEM fuel cell results in the generation of cationic species, typically protons. These protons must then cross the electrolyte to the cathode electrocatalyst where reaction with the oxidant generates water, thereby completing the electrochemistry. Typically, transport of protons across the ion-exchange membrane is assisted by water molecules. Thus, humidification of the ion-exchange membrane has been found to improve conductivity and hence fuel cell performance. In the case of Nafion®, high conductivity is observed in the presence of water due to the movement of protons between sulfonate clusters. In the absence of water, such free movement of protons is restricted and conductivity of the electrolyte is significantly decreased.

Traditionally, operation of PEM fuel cells have been limited to operational temperatures below 100° C. to limit dehydration of the ion-exchange membrane. At temperatures above 100° C., the vapor pressure of water increases rapidly, resulting in dehydration of the ion-exchange membrane and operational difficulties. For example, one technique for operating electrochemical fuel cells at temperature above 100° C. is to employ a pressurized humidification system for maintaining hydration of the electrolyte. Other techniques have involved attempts to improve fuel cell performance under low humidity conditions (which provides benefits at operational temperatures both above and below 100° C.).

One technique for improving fuel cell performance under low humidity conditions involves acid doping of the ion-exchange membrane with, for example, phosphoric acid. Such acid molecules act as the proton-conducting medium and are held in the membrane by non-covalent, acid-base ionic interactions. For example, phosphoric acid doping of polybenzimidazole (PBI) resin has shown some promise as an electrolyte for high temperature fuel cells. The phosphoric acid molecules are associated with the basic imidazole nitrogen atom through hydrogen bonding (see Wainright et al., *J. Electrochem. Soc.* 142(7):L121-123, 1995; U.S. Pat. No. 5,525,436). However, for such compositions, the operational temperature of the fuel cell must be maintained above 100° C. If the fuel cell falls below this temperature, condensed water within the fuel cell washes out the acid molecules, thus resulting in decreased performance (see, e.g., U.S. Published Application No. US2002/0068207).

The limitations associated with prior acid doping techniques have lead to further research in this area in an effort to better retain the acid molecules within the acid-doped membrane. For example, one technique involves doping of phosphoric acid molecules into a porous polybenzimidazole (PBI) membrane prepared through coagulation with subsequent drying, and then collapsing the membrane to physically trap the acid molecules (see U.S. Pat. Nos. 5,599,639 and 6,187,231). Another technique involves soaking finally divided PBI polymer in an acid that result in dissolution of the polymer and formation of a paste or gel that can then be applied to a polymer fabric or used directly as the electrolyte in a fuel cell (U.S. Pat. No. 5,945,233). While these techniques report improvements in retention of the doped acid, the amount of bound acid molecules per monomer repeat unit of the polymer does not change, and leaching of the unbound acid inevitably results in a decrease in performance of the fuel cell.

To reduce leaching of acid-doped membranes, attempts have been made to dope with organic sulfonic or phosphoric acids (see U.S. Pat. No. 6,124,060), or by covalently bonding organic sulfonic or phosphoric acids through N-alkyl or N-aryl linkages (see U.S. Pat. No. 4,933,397). Similarly, U.S. Pat. No. 4,634,530 is directed to the formation of a covalently bonded sulfonated PBI membrane by contacting the PBI membrane with a sulfonating agent, followed by heating the same for a period of time sufficient to convert the ionic bonds formed in the contacting step to covalent bonds.

More recently, water insoluble additives have been developed comprising a metal oxide cross-linked matrix having phosphonic acid groups covalently attached to the matrix through linkers (see Published U.S. Application No. US 2005/0112439 A1).

While advances have been made in this field, there remains a need for improved ion-exchange membranes for use in high temperature fuel cells. Furthermore, during start up, shut down, or low load conditions, such high temperature fuel cells may operate for some period of time at lower temperatures, such as lower than 100° C. Thus, improved ion-exchange membranes are needed that will perform to acceptable degrees over a wide range of operational temperatures. The present invention fulfils these needs and provides further advantages.

BRIEF SUMMARY OF THE INVENTION

In brief, the present invention provides a water insoluble additive for improving the performance of an ion-exchange membrane, especially in the context of high temperature operation of electrochemical fuel cells.

In one embodiment, the water insoluble additive comprises a metal oxide cross-linked matrix having proton-conducting (PC) groups covalently attached to the matrix through linkers. More specifically, the metal may be silicon, titanium, zirconium, germanium, aluminum, tin, or a combination thereof. In a more particular embodiment, the metal is silicon and the cross-linked matrix is a siloxane cross-linked matrix containing silicon atoms cross-linked by multiple disiloxy bonds (Si—O—Si) and having proton-conductor groups covalently attached to the silicon atoms through linkers (L). For example, the linker may be an alkanediyl group such as —$(CH_2)_3$—.

In another embodiment, an ion-exchange membrane loaded within the interior of the membrane with the water insoluble additive is disclosed. In a specific example, the water insoluble additive is a mixture of additives, each comprising different PC groups, and being heterogeneously dispersed throughout the ion-exchange membrane. In related embodiments, a membrane electrode assembly (MEA), fuel cell, fuel cell stack and/or products incorporating such an ion-exchange membrane are also disclosed.

In still further embodiments, methods for making an ion-exchange membrane having improved conductivity is disclosed. Such methods comprise the step of loading an ion-exchange membrane with the water insoluble additive of this invention. Such loading may be accomplished by casting the ion-exchange membrane with the additive and/or by in situ synthesis of the water insoluble additive within the ion-exchange membrane.

These and other aspects of the invention will be evident upon reference to the following detailed description.

DETAILED DESCRIPTION OF THE INVENTION

Figure 1:
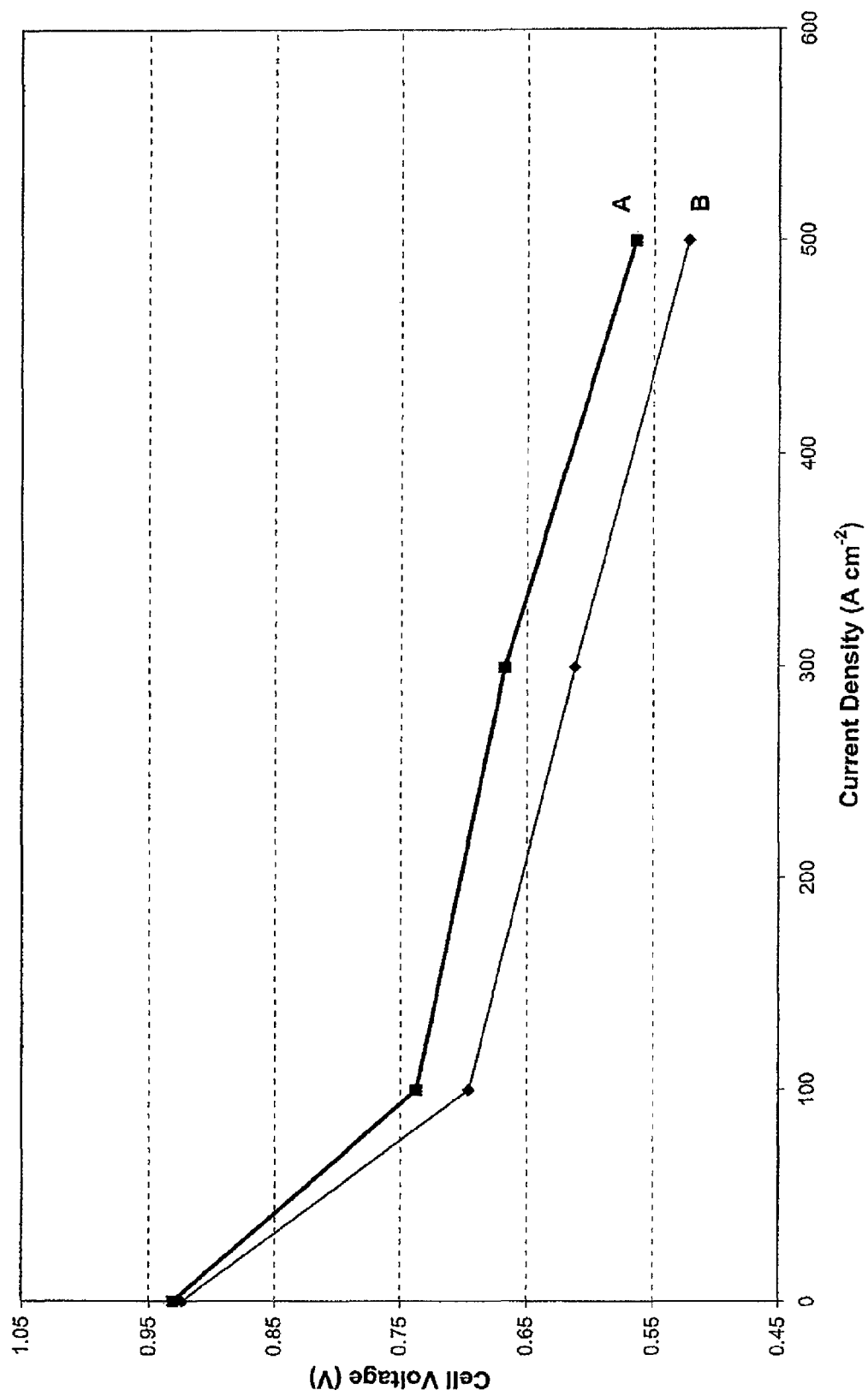
FIG. 1 shows polarization plots of voltage as a function of current density for two fuel cells under specified conditions.

As mentioned above, the present invention provides a water insoluble additive for improving the performance of an ion-exchange membrane. While such membranes have utility over a wide range of applications (including, for example, as ion-exchange filter, fuel cell applications, water electrolysis, and the like), for purpose of illustration such membranes are hereinafter discussed in the context of fuel cell applications.

In one embodiment, the water insoluble additive comprises a metal oxide cross-linked matrix having proton-conducting groups covalently attached to the matrix through linkers. Suitable metals are, for example, silicon, titanium, zirconium, germanium, aluminum and tin, as well as combinations thereof. In one embodiment, the additive may be a siloxane cross-linked matrix comprising silicon atoms cross-linked by multiple disiloxy bonds (Si—O—Si) and having multiple proton-conducting groups ("PC") covalently joined to silicon atoms of the matrix via linkers ("L"). The following discussion and examples will refer to such a siloxane (also depicted as "$SiO_2$/-L-PC") as a representative embodiment of the present additive, although this invention is not intended to be limited in this manner.

The water insoluble matrix may be prepared by, for example, the procedure set forth in the following Reaction Steps (1) and (2):

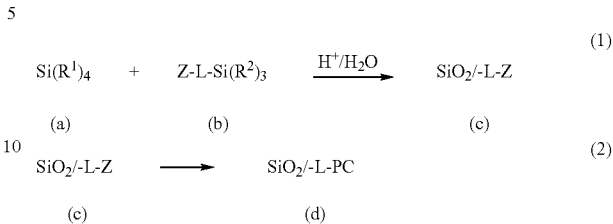

In Reaction Step (1), silane (a) is first reacted with Z-L-silane (b), a catalytic amount of water and a catalytic amount of concentrated acid which, upon heating, forms a gel that subsequently solidifies upon further heating to yield cross-linked intermediate (c). The "Z" moiety represents a proton-conducting (PC) group or a precursor to the same. In the case of Z being a precursor PC group, then Reaction Step (2) converts the Z precursor to the corresponding PC group. Such PC groups may be the same or different, and in a specific embodiment are not all phosphonic acid groups.

As used herein, L is a divalent linker, wherein the linker is alkyl, substituted alkyl, aryl, substituted aryl, arylalkyl or substituted arylalkyl.

Furthermore, $R^1$ and $R^2$ are, at each occurrence, the same or different and independently halogen, alkoxy, aryloxy, substituted aryloxy, arylalkoxy or substituted arylalkoxy. In a more specific embodiment, $R^1$ and $R^2$ are, at each occurrence, the same or different and individually alkoxy. In still a further embodiment, $R^1$ is ethoxy and $R^2$ is methoxy, in which case silane (a) is tetraethoxysilane and Z-L-silane (b) is Z-L-trimethoxysilane. In still a further embodiment, L is n-propyl (i.e., —$(CH_2)_3$—) and Z-L-trimethoxysilane (b) is Z-propyl-trimethoxysilane.

The following Reaction Steps (3) to (6) illustrate the initial reactions that occur in Reaction Step (1) above to yield cross-linked intermediate (c), $SiO_2$/-L-Z.

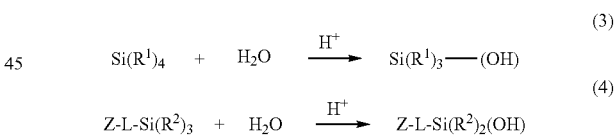

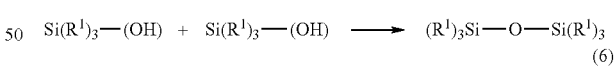

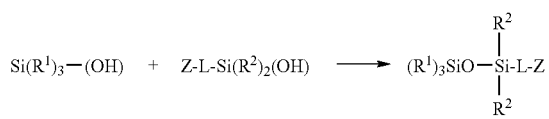

Reaction Steps (3) and (4) are acid catalyzed hydrolysis reactions, while Reaction Steps (5) and (6) are condensation and co-condensation reactions, respectively. In such a manner, a cross-linked matrix forms with multiple disiloxy bonds (Si—O—Si). Though not depicted separately above, condensation may also result in Z groups covalently joined to adjacent silicon atoms of the matrix.

While the silane starting material depicted in Reaction Scheme (1) above is shown as a tetra-functional silane, tri-functional silanes may also be utilized. For example, the silane includes, but is not limited to, $SiR(R^1)_3$, where R is an alkyl, substituted alkyl, aryl, substituted aryl, alkylaryl, or substituted alkylaryl. In one embodiment, silane is tetraethoxysilane, which is commercially available from any number of sources and is relatively inexpensive.

As used herein, an "alkyl" group means a straight chain or branched, noncyclic or cyclic, unsaturated or saturated aliphatic hydrocarbon containing from 1 to 10 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Representative saturated cyclic alkyls include cyclopropyl, cyclobutyl, cyclopentyl, cyclohexyl, —$CH_2$cyclopropyl, —$CH_2$cyclobutyl, —$CH_2$cyclopentyl, —$CH_2$cyclohexyl, and the like. Cyclic alkyls, also referred to as "homocyclic rings," and include di- and poly-homocyclic rings such as decalin and adamantyl. Unsaturated alkyls contain at least one double or triple bond between adjacent carbon atoms (referred to as an "alkenyl" or "alkynyl", respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1 butynyl, and the like.

"Aryl" means an aromatic carbocyclic moiety such as phenyl or naphthyl.

"Arylalkyl" means an alkyl having at least one alkyl hydrogen atoms replaced with an aryl moiety, such as benzyl, —$CH_2$(1 or 2-naphthyl), —$(CH_2)_2$phenyl, —$(CH_2)_3$phenyl, —$CH(phenyl)_2$, and the like.

The term "substituted" as used herein means any of the above groups (e.g., alkyl, aryl, or arylalkyl) wherein at least one hydrogen atom is replaced with a substituent. In the case of an oxo substituent ("=O") two hydrogen atoms are replaced. When substituted, "substituents" within the context of this invention include halogen, hydroxy, oxo, cyano, nitro, amino, alkylamino, dialkylamino, alkyl, alkoxy, alkylthio, haloalkyl, aryl, substituted aryl, arylalkyl, substituted arylalkyl, heteroaryl, substituted heteroaryl, heteroarylalkyl, substituted heteroarylalkyl, heterocycle, substituted heterocycle, heterocyclealkyl, substituted heterocyclealkyl, —$NR_aR_b$, —$NR_aC(=O)R_b$, —$NR_aC(=O)NR_aR_b$, —$NR_aC(=O)OR_b$—$NR_3SO_2R_b$, —$OR_a$, —$C(=O)R_a$, —$C(=O)OR_a$, —$C(=O)NR_aR_b$, —$OC(=O)NR_aR_b$, —SH, —$SR_a$, —$SOR_a$, —$S(=O)_2R_a$, —$OS(=O)_2R_a$, —$S(=O)_2OR_a$, wherein $R_a$ and $R_b$ are the same or different and independently hydrogen, alkyl, haloalkyl, substituted alkyl, aryl, substituted aryl, arylalkyl, substituted arylalkyl, heteroaryl, substituted heteroaryl, heteroarylalkyl, substituted heteroarylalkyl, heterocycle, substituted heterocycle, heterocyclealkyl or substituted heterocyclealkyl.

"Halogen" means fluoro, chloro, bromo and iodo.

The linker (L) is a divalent moiety covalently joining a silicon atom of the matrix to a corresponding phosphonic acid group. By covalently binding the phosphonic acid group to the matrix, leaching of phosphonic acid from the ion-exchange membrane is avoided. Further, since the matrix itself is water-insoluble, the matrix is not capable of being dissolved and thus washed out or leached from the ion exchange matrix.

Suitable linkers in this regard include any divalent moiety that is capable of joining the phosphonic acid group to a silicon atom via a covalent bond. Representative linkers include an alkanediyl group. As used herein, an "alkanediyl" groups means a divalent alkyl from which two hydrogen atoms are taken from the same carbon atom or from different carbon atoms. Representative alkanediyl groups include $C_{1-4}$alkanediyls such as —$CH_2$—, —$CH_2CH_2$—, —$CH_2CH_2CH_2$—, —$CH(CH_3)CH_2$—, and the like, and in a more specific embodiment is a divalent n-propyl group (i.e., —$CH_2CH_2CH_2$—). Other linkers include (but are not limited to) partially fluorinated or perfluorinated alkyl or alkyl ether moieties.

Suitable PC groups of this invention may take a variety of forms, and may be generally characterized as groups capable of conducting protons within an ion-exchange membrane, such as a PEM. In one embodiment, the PC groups are different chemical entities, each imparting different characteristics to the membrane. In another embodiment, the PC groups are the same chemical entity (with the exception that all the PC groups are not phosphonic acid groups).

In one embodiment, the PC group is sulfonic acid, with the precursor group, Z, being a thio moiety. Sulfonic acid generally requires the presence of water to conduct protons, and is thus referred to herein as a "hydrous proton conductor" (and the corresponding water insoluble additive is referred to as an "hydrous water soluble additive"). Representative thio moieties include, but are not limited to thiol (—SH) and sulfonyl halides (—$SO_2X$), as well compound containing disulfide (—S—S—) linkages. In a specific embodiment, Z is a thiol group (—SH), and in another specific embodiment is a sulfonyl halide (—$SO_2X$). In this embodiment, Reaction Step (2) above represents an oxidation step wherein the cross-linked intermediate (c), $SiO_2$/-L-Z, is oxidized to yield water insoluble matrix (d) having sulfonic acid groups (—$SO_3H$) covalently bound to silicon atoms of the matrix via linker L (i.e., $SiO_2$/-L-$SO_3H$). Such oxidation may be achieved by any of a variety of techniques known to one skilled in the art. For example, cross-linked intermediate (c) may be oxidized with hydrogen peroxide by, for example, spray coating with, or immersion in, the same. Such oxidation results in the conversion of the thio moiety into a sulfonic acid moiety, the sulfonic acid moiety being covalently bound to the insoluble matrix.

Alternatively, the precursor group, Z, may be a halogen, such as an alkyl bromide. The alkyl bromide is reached with sodium sulfite and results in a sulfonate salt, which is then reacted with acid (acid exchange) to achieve the sulfonic acid.

In another embodiment, the Z moiety is an ionic liquid precursor, which can be converted into an ionic liquid as the PC. An ionic liquid does not require the presence of water to conduct protons, and is thus referred to herein as an "anhydrous proton conductor" (and the corresponding water insoluble additive is referred to as an "anhydrous water insoluble additive"). Ionic liquids, as well as their precursors, are well known in the art. For example, Doyle et al., *J. Electrochem. Soc.,* 147:34-37, 2000, discloses 1-ethyl, 3-methyl imidazolium triflate (BMITf) and BMI tetrafluoroborate ($BMIBF_4$) ionic liquids. See also, U.S. Pat. No. 5,965,054 to McEwen et. al.; Yang et al., *J. Power Sources,* 103:1-9, 2001. Each of the above references are incorporated by reference in their entirety. In general terms, an ionic liquid precursor is a heterocyclic ring capable of bearing a cationic charge, including (but not limited to) pyridinium, pyridazinium, pyrimidinium, pyrazinium, imidazolium, pyrazolium, thiazolium, oxazolium, and triazolium.

In this embodiment, Reaction Step (2) above represents conversion of the ionic liquid precursor, Z, to the ionic liquid, PC, by reacting the precursor with a suitable agent that yields an anionic counterion to the cationic charge. For example, if the liquid precursor is 4,5-dihydroimidazoyl, conversion of the same to the ionic liquid may be achieved by reaction with an alkyl halide. Alternatively, the counterion may be sulfate, as halide counterions may adversely affect the catalyst-membrane interface.

In another embodiment, the Z moiety is a phosphonic acid group, as disclosed in Published U.S. Application No. US 2005/0112439, incorporated herein by reference in its entirety. As with an ionic liquid discussed above, phosphonic acid does not require the presence of water to conduct protons, and is thus referred to herein as an "anhydrous" proton conductor.

In still a further embodiment, at least two different PC groups are employed, and in a further embodiment, at least three different PC groups are employed. In this context, the PC groups may be selected from a wide variety of suitable proton conductors, and may include sulfonic acid, phosphonic acid and/or ionic liquids. By use of such a multi-functional, water insoluble matrix, a membrane may be generated having enhanced proton conductivity over wide range of operating conditions. Further, by employing a common matrix to impart water insolubility (i.e., a silicon matrix), a more uniformly doped membrane may be achieved.

In yet a further embodiment, the water insoluble additive for improving the performance of an ion-exchange membrane is achieved by the combination of both a hydrous and an anhydrous water insoluble additive. For example, the hydrous water insoluble additive may comprise sulfonic acid proton conducting groups, while the anhydrous water insoluble additive may comprise ionic liquid and/or phosphonic acid proton conducting groups. When incorporated into the ion-exchange membrane, separate domains may be formed of the hydrous and anhydrous proton conductors—that is, a heterogeneous blend of these two components is achieved on or within the ion-exchange membrane. In this manner, protons may be conducted within connected anhydrous domains, as well as connected hydrous domains, under conditions favored for proton conductivity therein. Homogenous blending of such domains is ineffective due to interference between the two distinct domains.

As mentioned above, the water insoluble additive of this invention finds application in, for example, improving the performance of the ion-exchange membrane of a fuel cell. In such applications, the additive is not water soluble under the operational temperatures typically encountered within a high temperature fuel cell, which are operated at temperatures in excess of 100° C. and typically in the range of from 100 to 150° C. As used herein, the phrase "water insoluble" means that the additive is not soluble in bulk water at room temperature. At higher temperatures, the additive may be slightly soluble in bulk water, yet the tendency to be solubilized diminishes once incorporated into an ion-exchange membrane. Without being bound by theory, the water solubility of such an additive may diminish as a result of hydrogen bonding to ionomeric functional groups within the ion-exchange membrane. Furthermore, the pore sizes within the ion-exchange membrane may not permit the additive to leach after growth of the additive in situ within the pore volume of the ion-exchange membrane, even though the additive may be slightly soluble in bulk water at the operating temperatures of the fuel cell.

As the equivalent weight of the additive decreases, the additive becomes a better proton conductor, as well as more soluble in water. The equivalent weight is the weight of the additive in grams divided by the number of moles of acid groups in the additive. The equivalent weight may be, for example, less than 2000 g/mole. In further embodiments, the equivalent weight is less than 1000 g/mole, less than 600 g/mole or even less than 400 g/mole. The lower limit of the equivalent weight is such that the additive remains insoluble (or only slightly soluble as discussed above) in water. For example, the equivalent weight of the additive may be greater than 150 g/mole, or greater than 250 g/mole.

Silicon dioxide, zirconium dioxide and organically modified silicates have been incorporated in Nafion® to improve the water management at high temperature operation of a fuel cell due to the hydrophilic nature of these materials (see, e.g., K. T. Adjemian, et al., *J. Electrochemical Soc.* 149(3) A256-A261, 2002; Q. Deng, et al., *J. Applied Polymer Science* 68, 747-763, 1998; and W. Apichatachutapan, et al., *J. Applied Polymer Science* 62, 417-426, 1996, each of which are herein incorporated by reference in their entirety). During prolonged operation of a fuel cell at high temperatures, the membrane may still become dehydrated even in the presence of these hydrophilic materials. In comparison, the present additive containing PC groups covalently linked to a metal oxide matrix allows proton conduction through the membrane even after prolonged operation of the fuel cell at high temperature.

The water insoluble additive may be applied to or incorporated within the ion-exchange membrane by any number of suitable techniques (see, e.g., Adjemian, et al., Q. Deng, et al., and Apichatachutapan, et al., as referenced above). The water insoluble additive may be made prior to incorporation within the ion-exchange membrane, or may be formed in situ. In the case of the former, the additive may be recast with solubilized ionomer or co-extruded. In the case of the latter, cross-linked intermediate (c) in Reaction Scheme (1) above may be incorporated into the ion-exchange membrane, and then hydrolyzed to yield the insoluble additive having the desired proton conducting groups covalently linked to the silicon atoms of the matrix. The particle size of the resulting functionalized water insoluble additive may range from, for example, 6 nm to 80 nm.

In the practice of this invention, an ion-exchange membrane is loaded with the water insoluble additive for improving the performance of the membrane. As used herein, "loading" of the membrane involves the introduction of the additive, either within the membrane or the surface of the membrane (or both) in an amount sufficient to achieve the desired level of improved performance. For example, in the context of a high temperature fuel cell, the ion-exchange membrane is loaded with an anhydrous water insoluble additive at a level sufficient to provide proton conductance at temperatures in excess of 100° C., and typically in the range of from 100 to 150° C. In a conventional fuel cell, reduced proton conductance is typically observed at temperatures in excess of 100° C.

As mentioned above, an important aspect of this invention is that the water insoluble additive improves conductivity under low humidity conditions, such as experienced within a fuel cell operating at temperatures in excess of 100° C. In addition, the water insoluble matrix is not washed out or leached during high humidity conditions, such as when the fuel cell is operated at temperatures lower than 100° C. Further, the silicon matrix helps retain water within the membrane via hydrogen bonding interactions with the silicate, thus improving performance at lower temperatures by improving conductivity. Thus, an ion-exchange membrane loaded with the water insoluble matrix of this invention is capable of operating over a wider range of temperatures than existing fuel cell membrane (e.g., over temperatures ranging from 50 to 150° C.).

In the embodiment wherein the membrane comprises a mixture of both hydrous and anhydrous water insoluble additives, the hydrous proton conducting groups (e.g., sulphonic acid groups) enhances proton conductance under high humidity conditions, such as when the fuel cell is operated at temperatures lower than 100° C. In contrast, the anhydrous water insoluble additive (e.g., ionic liquid and/or phosphoric acid) enhances proton conductance under low humidity conditions, such as when the fuel cell is operated at temperatures in excess of 100° C., and typically in the range of from 100 to 150° C. In this context, the hydrous and anhydrous water insoluble additives are loaded in a manner to achieve a heterogeneous blend, thereby resulting in connected hydrous domains and connected anhydrous domains, with such connected domains permitting proton conductance under either hydrous or anhydrous conditions, respectively. This can be achieved by, for example, the application of an electric field during curing of a polymeric matrix resulting in the agglomeration of the ion-exchange sites in long linear chains extending across the membrane. See, e.g., Oren et al., *J. Membrane Science,* 239:17-26, 2004 (hereby incorporated by reference in its entirety).

In still other embodiments, an ion-exchange membrane loaded with the water insoluble matrix is also disclosed, as well as a membrane electrode assembly (MEA), fuel cell and/or fuel cell stack containing the same. Further, fuel cell systems and end-use applications are also within the scope of this invention, including both stationary and mobile applications containing the same.

The following examples are provided by way of illustration, not limitation.

EXAMPLES

Example 1

Preparation of Water Insoluble Matrix

In a vial were placed tetraethoxysilane (4.0 g, 2.9 mmol), diethylphosphonatopropyltriethoxysilane (2.0 g, 2.9 mmol) and a magnetic stir bar. Water (0.2 g, 6.7 mmol) was added with stirring followed by concentrated hydrochloric acid (1.2 wt %, 0.8 g, 2.9 mmol) resulting in an exotherm reaching 50 to 56° C. The solution was stirred with heating to 80 to 90° C. to allow for the evaporation of ethanol, producing 3.6 g of a light yellow powder. The final solids were then filtered.

After filtering, the product may be further hydrolyzed by refluxing in a solution of 1:4 glacial acetic acid:concentrated HCl for 18 hours to convert the phosphonate ester groups to phosphonic acid. Once it cools, the suspension may then be poured into deionized $H_2O$ and the product filtered off.

The solid additive from Example 1 may be dispersed by techniques known to one skilled in this field into either (i) a solution of an ion-exchange resin prior to casting a film, or (ii) a hot melt of a base material prior to conversion into an ion-exchange membrane. In the latter embodiment, the solid additive may be dispersed into a hot melt of a partially fluorinated polymer, such as ethylene chloro-trifluoroethylene (ECTFE), followed by irradiation grafting and sulfonation.

Example 2

In situ Preparation of Water Insoluble Matrix within Ion-Exchange Membrane

In a vial were placed an 11% wt % solution of Flemion® in N,N-dimethylacetamide (94.3 g), diethylphosphonatopropyltriethoxysilane (10.2 g, 29.6 mmol) and tetraethylorthosilicate (10.0 g, 47.5 mmol), and a magnetic stir bar. Water (0.12 g, 6.7 mmol) was added with stirring followed by concentrated hydrochloric acid (35 wt %, 0.3 g, 2.9 mmol). The solution was stirred with heating to a temperature of 120 to 130° C. for 5 minutes, then allowed to cool to room temperature.

A portion of the cooled solution (79.14 g) was diluted with reagent alcohol (156.2 g). This diluted solution was further divided and a portion (78.3 g) poured into a 23 cm×13 cm of ultra-high molecular weight porous polyethylene (Solupor®, supplied by DSM). The membrane was heated on a hot plate until dry (temperature of the membrane=70° C.). The membrane was then removed from the carrier paper.

Hydrolysis of the ester groups was carried out by refluxing the membrane in 250 mL of 1:4 glacial acetic acid:concentrated HCl for 18 hours. Once cooled, the membrane was washed with deionized water until the washings were neutral. A small portion (3.5 cm×6 cm) was soaked in 2 M NaCl for 18 h and titrated with NaOH solution. EW=860 g/mole.

Example 3

In situ Preparation of Water Insoluble Matrix within Ion-Exchange Membrane

In a vial were placed N,N-dimethylacetamide (33.11 g), diethylphosphonatopropyltriethoxysilane (8.72 g, 25.5 mmol), tetraethylorthosilicate (5.12 g, 24.6 mmol) and a magnetic stir bar. Water (0.062 g, 3.4 mmol) was added with stirring followed by concentrated hydrochloric acid (35 wt %, 0.15 g, 1.5 mmol). The solution was stirred with heating to a temperature of 120 to 130° C. for 5 minutes, then allowed to cool to room temperature.

Two membranes were cast. For membrane A, a portion of the cooled solution (0.5 mL) was diluted with an 18 wt % solution of a sulfonated poly(aryl ether ketone) in N,N-dimethylacetamide (49.5 mL). A film was cast on a sheet of carrier paper (5 mil Melinex® 453) at room temperature using a doctor blade gap of 180 µm, with subsequent drying at 60° C. (20 min) and 140° C. (20 min). The same protocol was followed for membrane B, except that no water soluble matrix solution was added to the solution of sulfonated poly(aryl ether ketone).

Membrane A was removed from the carrier paper prior to hydrolysis. Hydrolysis of the ester groups was carried out by refluxing a section of membrane A (0.20 m×0.50 m) in 2 L of 1:4 glacial acetic acid:concentrated HCl for 18 hours. Once cooled, membrane A was washed with deionized water until the washings were neutral. EW=690 g/mole; 0.83 wt % water insoluble matrix.

Example 4

Use of a Sulfonated Ion-Exchange Membrane Containing Water Insoluble Matrix in a Fuel Cell The membranes prepared as described in Example 3 were each bonded to two catalyzed carbon fiber paper electrodes to form a membrane electrode assembly having a total platinum catalyst loading of 1.25 mg/cm². The two membrane electrode assemblies were tested in Ballard single cell fuel cells (active area=50 cm²). The following operating conditions were used:

Temperature: 60° C.
Relative humidity (RH): 30%
Fuel: hydrogen
Oxidant: air
Reactant inlet pressure: 3.02 bara for fuel and oxidant
Reactant stoichiometries: 9 fuel and 12 oxidant FIG. 1 shows polarization plots of voltage as a function of current density for the two fuel cells under the specified conditions. As is clear from FIG. 1, the membrane incorporating the water insoluble matrix (A) demonstrated significantly improved performance under low humidity conditions compared to the same membrane without the water insoluble matrix (B).

Example 5

Synthesis of Ionic Liquid Functionalized Silica

Silica precursor: In a vial with stir bar were added 99.8 g (2.1 moles) tetraethylorthosilicate, 30.4 g methanol, 13.2 g water, and 7.6 g concentrated hydrochloric acid. The mixture was allowed to react at room temperature for two days with stirring, producing a clear silica solution of increased viscosity.

Ionic Liquid N-butyl-3-triethoxysilylpropyl-4,5-dihydroimidizolium bromide: In a vial were weighed 6.3 g (23 mmoles) 3-triethoxysilyl propyl-4,5-dihydroimidizolium and 3.3 g (24 mmoles) bromobutane, producing a clear orange mixture. The mixture was then heated until the color became a consistent, darker orange and the viscosity increased. Three grams of this ionic liquid was dissolved in 5 g of methanol to improve mixing with the silica precursor.

Ionic Liquid Functionalized silica: In a vial were charged 6.55 g of the silica precursor with 2.79 g of the ionic liquid/methanol mixture, producing a clear orange solution. The solution was allowed to react at room temperature for 8 days, when particle size analysis by light scattering showed the resulting ionic liquid functionalized silica solution to contain 40 nm particles.

Example 6

Synthesis of Phosphonic Acid-Functionalized Titania-Silica

Titanium oxide hydrolyzation: Into a vial was charged 0.6 g of titanium oxide, 1.5 g of $H_2O$, 0.9 g 1M $NH_3.H_2O$, and 8.7 g $CH_3OH$. The reaction was kept for one day at room temperature. The solids concentration was 5.1 wt %.

Phosphonic acid-functionalized titania-silica preparation: Into a vial was charged 5 g hydrolyzed PETES (solids concentration of 30 wt %) and 8.6 g hydrolyzed titanium oxide. The reaction was kept at room temperature for 3 to 6 days to form the functionalized particle. The phosphonic acid-functionalized titania-silica particle was measured by light scattering to be 390 to 420 nm.

Example 7

Synthesis of Phosphonic Acid-Functionalized Zirconia-Silica

Phosphonic acid-functionalized zirconia-silica preparation: To a vial was charged 5 g of hydrolyzed PETES (solids concentration of 30 wt %), 0.67 g zirconium oxide powder, 0.5 g of $H_2O$, and 2.3 g $CH_3OH$. The reaction was kept at room temperature for 3 to 6 days to produce the functionalized particle. The phosphonic acid-functionalized titania-silica particle was measured by light scattering to be 190 to 220 nm.

Example 8

Membrane Incorporating Sulfonic-Acid Functionalized Silica

Silica TEOS precursor preparation: In a vial 10.4 g of tetraethylorthosilicate (TEOS), 15.5 g methanol, 0.01M NaCl (0.6 mL) and 1M $NH_3.H_2O$ (1.25 mL) were added, and the pH adjusted to about 9-10 by the addition of $H_2O$. The mixture was allowed to react at room temperature for 24 hours, producing the silica precursor as a clear solution of increased viscosity.

3-Mercaptopropyl-triethoxysilane (MPTMS) colloidal preparation: 9.8 g MPTMS, 1M $NH_3.H_2O$ (2.3 mL), and 0.01M NaCl (1.2 mL) were added into a vial. The pH was adjusted to about 10 by adding $H_2O$. The mixture was allowed to react for 24 hours, producing a clear MPTMS colloidal solution with increased viscosity.

Membrane with functionalized sulfonic acid silica: The colloidal MPTMS and silica precursor were co-condensed under basic conditions with different molar ratios (e.g., 5:5, 6:4, 7:3, etc.) for 24 to 96 hours. The resulting solutions were mixed with Nafion® under ultrasonic conditions, then cast as composite membranes on glass. After the composite membranes were dried and annealed, the membranes were further oxidized by adding $H_2O_2$ at room temperature for 24 hours (e.g., SH—R—$SiO_2$ oxidized to $SO_3H$—R—$SiO_2$).

Example 9

Membrane Incorporating Phosphonic-Acid Functionalized Silica

Silica TEOS precursor preparation: In a vial 7.8 g TEOS, 18.5 g methanol, 2M HCl 1 ml, and 1 g $H_2O$ were added. The mixture reacted at room temperature for 24 hours, producing the silica precursor as a clear solution with increased viscosity.

Diethoxyphosphorylethyl-triethoxysilane (PETES) colloidal preparation: PETES was pre-hydrolyzed by, for example, dissolving 3.28 g PETES in 50 mL of concentrated HCl and stirring in a three-necked flask with a condenser and $N_2$ bubbling into the solution. The temperature was maintained at 85° C. for about 24 hours. After cooling down to 40° C., the HCl was removed under reduced pressure. The lightly yellow viscous hydrolyzed PETES was obtained with a yield of 95%. The hydrolyzed PETES was dissolved in $CH_3OH$ at a concentration of about 30 wt %.

Membrane with functionalized phosphonic acid silica: Membranes were made by dispersing the silica mixture with 20% w/w solids 950EW Nafion solution under ultrasonic conditions. Membranes of theoretical 5, 10 and 15% silica solids were cast, dried at room temperature overnight, and annealed at 100° C. for one hour and then at 150° C. for one hour. The thickness of the films was about 30 um.

Example 10

Membrane Incorporating Phosphonic Acid-Functionalized Silica and Sulfonic-Acid Functionalized Silica To a vial were charged 7.8 g (0.0375 moles) of tetraethyl orthosilicate (TEOS), 14.6 g methanol and 1.4 g 1N ammonium hydroxide. The mixture was allowed to stir at room temperature for 72 hours, producing a milky solution. To the solution were then added dropwise 4.46 g (0.01875 moles)

merpcaptopropyltriethoxysilane (MPTES) and 6.15 g (0.01875 moles diethylphosphonatotriethoxysilane (DEPTES). The mixture was then allowed to stir at room temperature for another 24 hours. The solution was then diluted with methanol to a theoretical 15% solids.

Membranes were made by dispersing the silicate mixture with 22% w/w solids 1050 EW Nafion® solution. Membranes of theoretical 3, 6 and 10% silica solids were cast, dried and processed to yield films of approximate 30-35 um thickness. The films were then treated with 30% w/w hydrogen peroxide at room temperature for 16 hours to oxidize mercapton functionalities to sulfonic acid groups. The same films were then treated with 80:20 v/v concentrated hydrochloric acid/glacial acetic acid to hydrolyse the phosphonate esters to phosphonic acid groups. The membranes containing the 3, 6 and 10% silica solids were analyzed for silicon content using neutron activation analysis, and were found to have a silicon content of ~6100 ppm, ~9800 ppm and ~14,600 ppm, respectively.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A membrane electrode assembly comprising an ion-exchange membrane which comprises an ionomer and a water insoluble additive, the water insoluble additive comprising a metal oxide cross-linked matrix having proton-conducting groups covalently attached to the metal atoms through linkers, and wherein the metal is silicon, titanium, zirconium, germanium, aluminum, tin, or a combination thereof, with the proviso that the proton-conducting groups are not all phosphonic acid groups.

2. The membrane electrode assembly of claim 1 wherein the proton conducting groups are hydrous proton conducting groups.

3. The membrane electrode assembly of claim 2 wherein the hydrous proton conducting groups are sulfonic acid groups.

4. The membrane electrode assembly of claim 1 wherein the proton conducting groups are anhydrous proton conducting groups.

5. The membrane electrode assembly of claim 4 wherein the anhydrous proton conducting groups are ionic liquids, phosphonic acid groups, or a combination thereof.

6. The membrane electrode assembly of claim 1 wherein the proton conducting groups comprise hydrous and anhydrous proton conducting groups, and wherein the water insoluble additives are in the form of a heterogeneous blend of connected hydrous domains and connected anhydrous domains.

7. The membrane electrode assembly of claim 1 wherein the metal is silicon and the cross-linked matrix is a siloxane cross-linked matrix.

8. The membrane electrode assembly of claim 1 wherein the linker is a divalent alkyl group.

9. The membrane electrode assembly of claim 8 wherein the divalent alkyl is a divalent straight chain $C_{1-4}$ alkyl.

10. The membrane electrode assembly of claim 9 wherein the divalent alkyl is —$CH_2CH_2CH_2$—.

11. The membrane electrode assembly of claim 1 wherein the water insoluble additive is heterogeneously dispersed within the ion-exchange membrane.

12. A fuel cell comprising the membrane electrode assembly of claim 1.

13. A fuel cell stack comprising a fuel cell of claim 12.

* * * * *